United States Patent
Kreuzer

(12) 
(10) Patent No.: US 6,315,320 B1
(45) Date of Patent: Nov. 13, 2001

(54) IMPACT PROTECTION DEVICE

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/300,781

(22) Filed: Apr. 27, 1999

(30) Foreign Application Priority Data

Apr. 28, 1998 (DE) .......................................... 298 07 644 U

(51) Int. Cl.[7] ................................................. B60R 21/22
(52) U.S. Cl. .................................... 280/728.2; 280/728.3; 280/730.2
(58) Field of Search ........................ 280/728.1, 728.2, 280/728.3, 730.1, 730.2, 748

(56) References Cited

U.S. PATENT DOCUMENTS

| | | | | |
|---|---|---|---|---|
| 5,316,334 | * | 5/1994 | Skidmore | 280/728.3 |
| 5,330,223 | * | 7/1994 | Hiramitsu et al. | 280/728.3 |
| 5,667,242 | * | 9/1997 | Slack et al. | 280/728.2 |
| 5,799,971 | * | 9/1998 | Asada | 280/730.2 |
| 5,845,930 | * | 12/1998 | Maly et al. | 280/728.3 |
| 5,845,932 | * | 12/1998 | Kimura et al. | 280/728.2 |
| 5,911,434 | * | 6/1999 | Townsend | 280/730.1 |
| 6,050,636 | * | 4/2000 | Chevallier et al. | 280/728.1 |
| 6,082,760 | * | 7/2000 | Ukai et al. | 280/729.3 |
| 6,089,594 | * | 7/2000 | Hasagawa et al. | 280/728.2 |

FOREIGN PATENT DOCUMENTS

| | | | |
|---|---|---|---|
| 5-178150 | * | 7/1993 | (JP) . |
| 976867 | | 3/1997 | (JP) . |
| 9188215 | | 7/1997 | (JP) . |
| 10152010 | | 6/1998 | (JP) . |

* cited by examiner

*Primary Examiner*—J. J. Swann
*Assistant Examiner*—Christopher Bottorff
(74) *Attorney, Agent, or Firm*—Tarolli, Sundheim, Covell, Tummino & Szabo L.L.P.

(57) ABSTRACT

Proposed is an impact protection device for installation in the backrest of motor vehicle seats, including an air bag module with a gas bag, an inflator and an ignition device, as well as including a cap covering the installation opening, capable of being hinged from a closed position into an opened position and permitting in the opened position unobstructed forward deployment of the gas bag. To ensure that total deployment of the gas bag cannot be obstructed by intruding side structural parts, the impact protection device in accordance with the invention is characterized in that the cap is configured mechanically reinforced, that it is capable of being hinged from a closed position oriented substantially parallel to the vehicle longitudinal axis into the opened position oriented substantially perpendicular to the vehicle longitudinal axis and that it forms in the opened position a stable spacing structure between the backrest of the vehicle seat and the portion of the vehicle body opposite thereto.

5 Claims, 2 Drawing Sheets

IMPACT PROTECTION DEVICE

FIELD OF THE INVENTION

The invention relates to an impact protection device for installation in the backrest of motor vehicle seats, including an air bag module with a gas bag, an inflator and an ignition device, as well as including a cap covering the installation opening, capable of being hinged from a closed position into an opened position and permitting in the opened position unobstructed forward deployment of the gas bag.

BACKGROUND OF THE INVENTION

Such impact protection devices are able to significantly diminish the risk of injury of the vehicle occupant when the vehicle is involved in a side collision, as long as the gas bag is totally inflated before the occupant comes into contact with side parts of the vehicle body in a crash situation. Whilst the protection devices effective in a head-on collision need to be inflated within 30 to 60 ms for the driver and front passenger, this time is only 10 to 20 ms in the case of side air bags since the reaction travel is substantially shorter. Depending on the nature of the side collision and the design configuration of the vehicle body parts involved there is the risk of the gas bag getting caught in its deployment phase by side structural parts intruding into the vehicle passenger compartment thus preventing total inflation. Accordingly, the protective effect of the gas bag is diminished.

SUMMARY OF THE INVENTION

The invention is based on the object of ensuring in the case of an impact protection device of the aforementioned kind that total deployment of the gas bag cannot be obstructed by intruding side structural parts, instead the gas bag being fully inflated prior to there being any contact between the side structural parts and the vehicle occupant.

To achieve this object it is proposed in accordance with the invention that the cap covering the installation opening for the gas bag is configured mechanically reinforced. The cap is capable of being hinged from a closed position, in which the cap is oriented substantially parallel to the vehicle longitudinal axis, into a position in which the cap is oriented substantially perpendicular to the vehicle longitudinal axis. The cap forms in the opened position a stable spacing means between the backrest of the vehicle seat and the portion of the vehicle body opposite thereto.

In the installation region of the air bag module the backrest of vehicle seats has a width of more than 100 mm, permitting the arrangement of a cap having a width of at least 70 to 80 mm. When this cap is configured in accordance with the invention and arranged such that it is oriented and arrested transversly to the vehicle longitudinal axis on activation of the air bag, it may be active as a spacing means between the backrest of the seat and the side structural parts of the vehicle body at least as long as is required until the gas bag is totally inflated. In addition, it is in this way that to any intrusion of side structural parts into the passenger compartment of the vehicle, an additional resistance is opposed via the seat structure and its attachment in the floor region of the vehicle body.

BRIEF DESCRIPTION OF THE DRAWINGS

Expedient designs of the gist of the invention are described in the sub-claims 2 to 8. Further details will now be explained by way of embodiments with reference to the FIGS. 1 to 3 in which:

DESCRIPTION OF THE PREFERRED EMBODIMENTS

Figure 1:
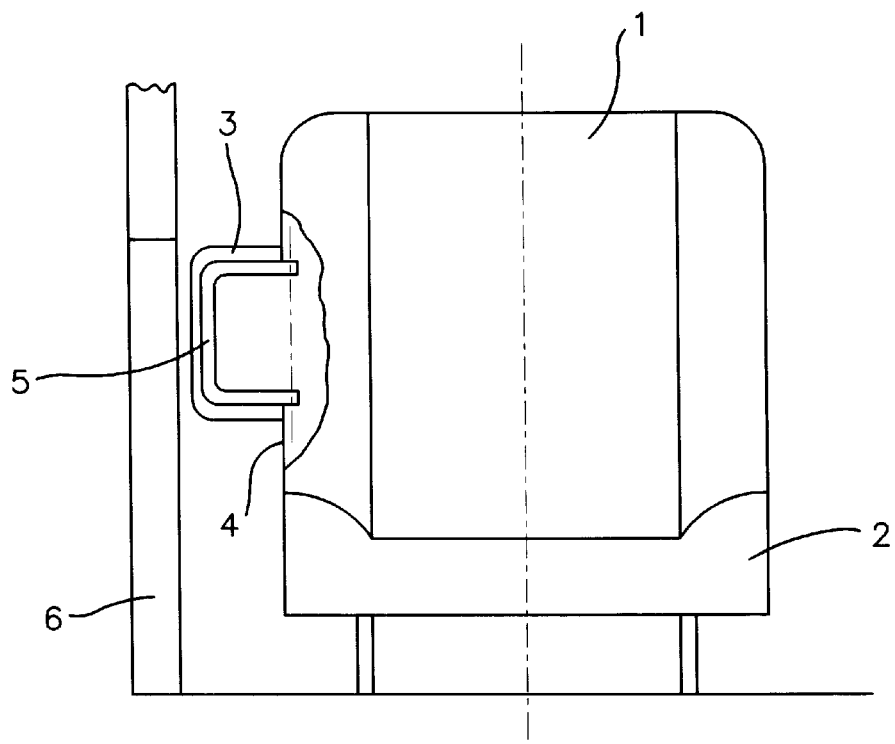
FIG. 1 is a schematic view of the hinged-open cap as seen from the front
Figure 2:
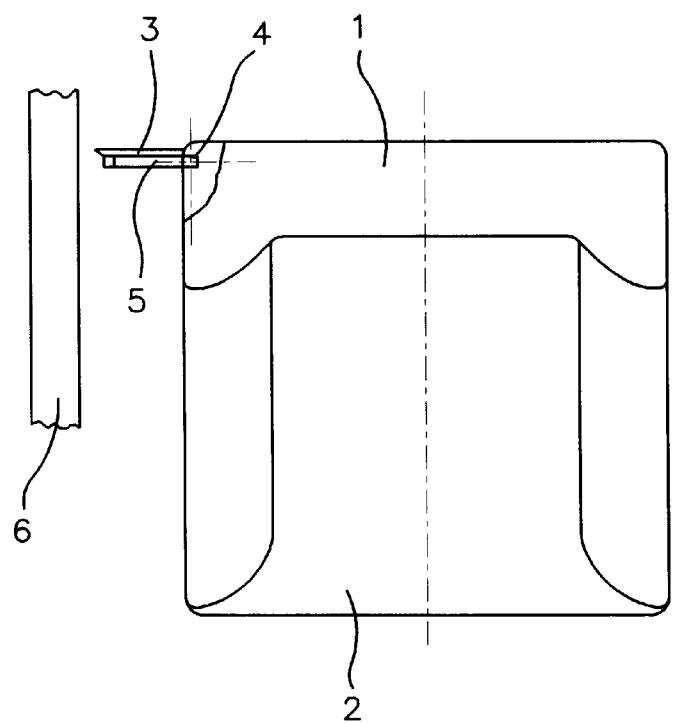
FIG. 2 is a schematic view of the hinged-open cap as seen from above

Referring now to FIGS. 1 and 2 there is illustrated schematically the backrest of a vehicle seat identified by the reference numerals 1 and 2, respectively, in which an air bag module (not shown) is integrated, the installation opening of which is covered by a cap 3. In accordance with the invention this cap 3 is capable of being hinged about a hinging axis 4 running roughly parallel to the main plane of the backrest 1 from its closed position into its opened position as shown and is reinforced mechanically by webs or tubular parts 5 to such an extent that it is able to form an adequately stable spacing means between backrest 1 and the opposite vehicle body parts 6 which in the case of a side collision may be forced to intrude more or less into the passenger compartment of the vehicle.

Figure 3:
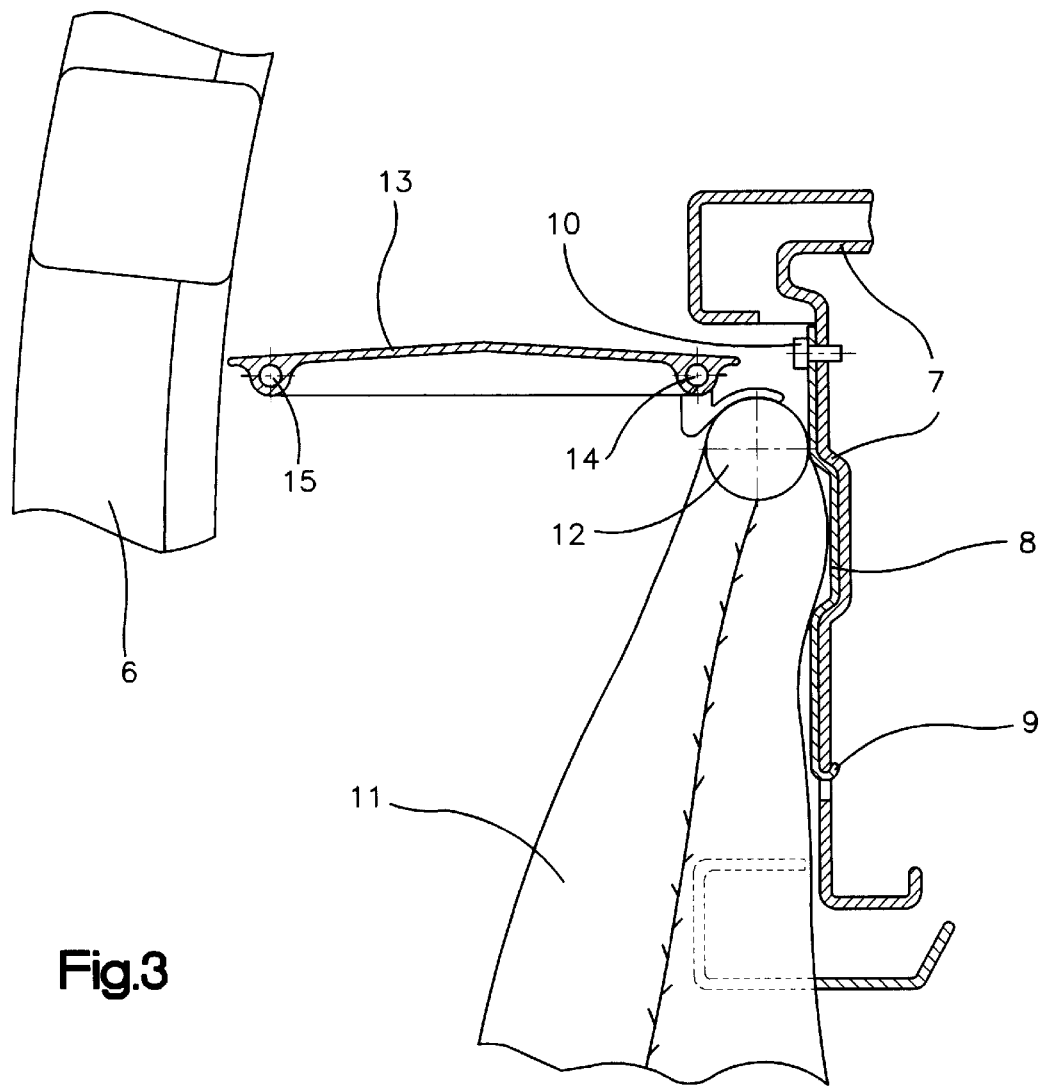
FIG. 3 is a horizontal section through one design embodiment of the hinged-open cap.

Referring now to FIG. 3 there is illustrated a design embodiment showing only the supporting, internally disposed frame components 7 of the backrest. Secured to this frame is the baseplate 8 of an air bag module by means of a front hooking engagement 9 and screw 10. The air bag module comprises a gas bag 11 and an inflator 12 with the ignition device (not shown). The installation opening for the air bag module in the side wall of the backrest is covered, when installed, by a cap 13 which on activation of the protection device is capable of being hinged about the hinging axis 14 into the position as shown. The cap 13 is a cast component in the embodiment illustrated, reinforced by an inserted tubular frame 15. As an alternative or additionally thereto, of course, cast ribs or the like may be provided which expediently extend parallel to the main direction in which the cap 13 is stressed. The reference numeral 6 in turn identifies the side structural parts of the vehicle body opposite the installation opening for the air bag module in the backrest. Where front seats are arranged for fore and aft adjustment this is a region in the vicinity of the baseplate which is of considerable importance for the structural strength of the vehicle body in the case of a side collision. As already mentioned the hinged-open cap 13 may contribute towards stiffening the vehicle body since the forces causing an intrusion of side structural parts may be diverted at least in part via the cap 13 and the frame components of the seat into the floor plate of the vehicle body.

Irrespective of whether the frame components 7 of the seat are also deformed at the same time, it is the hinged-open cap 3 and 13, respectively, that ensures that the gas bag 11 is able to deploy unobstructed before side structural parts of the vehicle body intrude into the passenger compartment and possibly catch the gas bag before it is fully inflated.

What is claimed is:

1. An impact protection device in a backrest of a seat of a motor vehicle, comprising:

an air bag module with a gas bag and an inflator; and a cap with mechanical reinforcement means, being hinged at one of said backrest and said airbag module, said back rest defining an installation opening for said airbag module, said cap being capable of being folded from a closed position in which said cap is oriented substantially parallel to a vehicle longitudinal axis to an opened position in which said cap is oriented substantially perpendicular to said vehicle longitudinal axis, said cap covering said installation opening in said closed position, and said cap, in said opened position, forming a stable spacing means between said backrest of the seat and a portion of the vehicle body opposite to said backrest and permitting unobstructed forward deployment of said gas bag, said cap consisting of a stable sheet-metal part externally provided with a covering layer matching with the installation surroundings.

2. The impact protection device as set forth in claim 1, wherein said cap is reinforced by webs.

3. The impact protection device as set forth in claim 1, wherein said cap is reinforced by tubular parts.

4. An impact protection device in a backrest of a seat of a motor vehicle, comprising:

an air bag module with a gas bag and an inflator; and a cap with mechanical reinforcement means, being hinged at one of said backrest and said airbag module, said backrest defining an installation opening for said airbag module, said cap being capable of being folded from a closed position in which said cap is oriented substantially parallel to a vehicle longitudinal axis to an opened position in which said cap is oriented substantially perpendicular to said vehicle longitudinal axis, said cap covering said installation opening in said closed position, and said cap, in said opened position, forming a stable spacing means between said backrest of the seat and a portion of the vehicle body opposite to said backrest and permitting unobstructed forward deployment of said gas bag, said cap consisting of a cast component having integrally formed ribs and being provided with a covering layer matching with the installation surroundings.

5. An assembly comprising a side structure of a vehicle body, a backrest of a vehicle seat arranged next to said side structure, and a side impact protection device being arranged in an installation opening in said backrest, said impact protection device including an airbag module comprising a gas bag and an inflator, said side impact protection device further including a cap covering said installation opening in said backrest, said cap being configured mechanically reinforced and upon activation of said side impact protection device being rigidly hinged about a hinging axis from a closed position oriented substantially parallel to the vehicle longitudinal axis into an opened position oriented substantially perpendicular to said vehicle longitudinal axis, said cap in said opened position permitting unobstructed forward deployment of said gas bag and simultaneously forming a rigid brace between said backrest and said side structure of said vehicle body preventing obstruction of deployment of said gas bag by said side structure.

* * * * *